United States Patent [19]

Ferrero et al.

[11] Patent Number: 4,706,372
[45] Date of Patent: Nov. 17, 1987

[54] DEVICE FOR EFFECTING AUTOMATIC EXCHANGE OF MEASURING TOOLS IN A MEASURING ROBOT OR MACHINE

[75] Inventors: Franco Ferrero, Moncalieri; Enrico Garau, Turin, both of Italy

[73] Assignee: D.E.A. Digital Electronic Automation S.p.A., Moncalieri, Italy

[21] Appl. No.: 866,771

[22] Filed: May 23, 1986

[30] Foreign Application Priority Data

Jun. 11, 1985 [IT] Italy ................................ 67543 A/85

[51] Int. Cl.⁴ ........................................... B23Q 3/155
[52] U.S. Cl. ..................................... 29/568; 29/26 A; 211/1.5; 901/41
[58] Field of Search ................. 901/41; 29/568, 26 A; 211/1.5; 409/230

[56] References Cited

U.S. PATENT DOCUMENTS 3,851,562 12/1974 Tomita et al. ........................ 29/568
4,604,787 8/1986 Silvers, Jr. ............................ 29/568

Primary Examiner—Z. R. Bilinsky

Attorney, Agent, or Firm—Gifford, Groh, VanOphem, Sheridan, Sprinkle and Dolgorukov

[57] ABSTRACT

The device comprises a series of tool carriers each of which is provided with a tool, a connector tang and aseries of three abutments disposed substantially around the axis of the tool and in a plane orthogonal to the axis itself, a rack provided with a plurality of seats each of which is able to support a tool carrier, a support unit fixed to the head of the machine is provided with a series of frontal surfaces operable to constitute bearings for the said abutments; this unit is provided with connector means operable to grip the connector tang of one of the tools, and displacement means operable to support the connector means and to displace it with respect to the support unit in the direction of the axis of the tool from a first position in which the abutments of the said series of abutments are at a predetermined distance from the frontal surface of the first defined series, to a second position in which the abutments themselves are in contact with the frontal surfaces, the displacement from the first to the second position being controlled by a spring.

13 Claims, 6 Drawing Figures

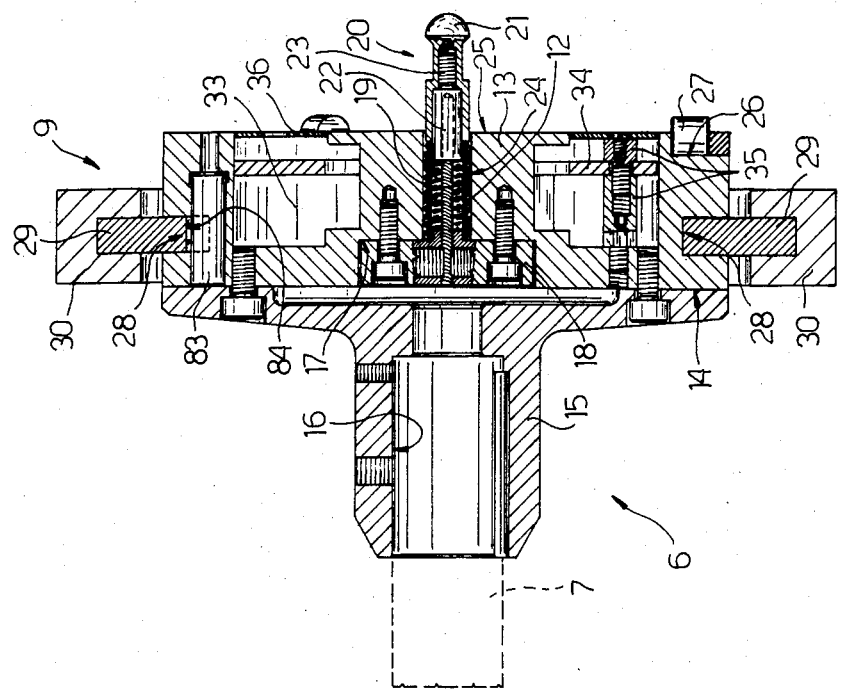
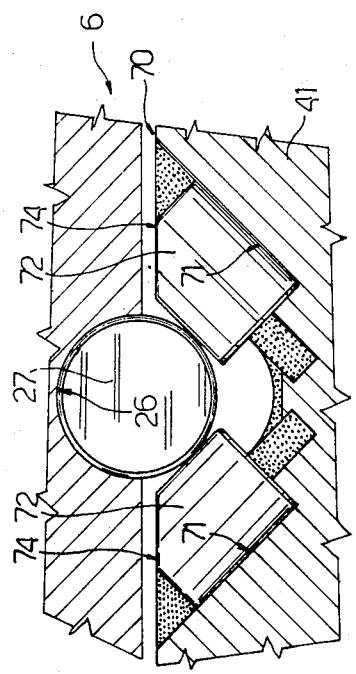
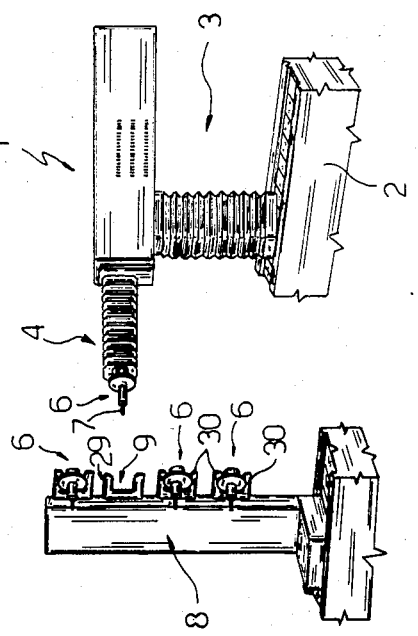

DEVICE FOR EFFECTING AUTOMATIC EXCHANGE OF MEASURING TOOLS IN A MEASURING ROBOT OR MACHINE

BACKGROUND OF THE INVENTION

The present invention relates to a device for automatically effecting exchange of measuring tools in a measuring machine or a measuring robot, which substantially comprises a movable measuring arm operable to support a measuring tool, provided with a feeler which is carried in contact with the surface of the workpiece to be measured.

As is known, measuring tools of machines of this type are constituted by sensors provided with a feeler member carried into contact with the surfaces of the workpiece to be measured, which feelers are able to generate electrical signals to be sent to an electronic calculator and suitably processed for providing the required dimensional data.

In known machines of this type the tools are fixed to a tool carrier device connected to the end of a movable measuring arm of the machine and their replacement on the tool carrier is effected manually. Moreover, each replacement operation of the tool inevitably involves the performance of supplementary operations on the machine for the purpose of rigorously positioning the three coordinate axes of each feeler with respect to the coordinate axes of the fixed frame of reference (operation of resetting of the tool). Since, for detecting the dimensions and form of a rather complex mechanical workpiece it is necessary to change the tools many times, each tool being particularly adapted to investigate a portion of the surface of the workpiece itself, the overall time required for effecting manual assembly and dismantling operations and for resetting the tools is rather high; moreover, measuring errors can occur if the tool resetting operations are not rigorously performed.

There are also known machines of this type in which the tool carrier is provided with a plurality of tools of different form and dimensions, each of which is particularly adapted to investigate a predetermined portion of the surface of the workpiece, in this case, to bring a new tool into the working position it is not necessary to effect a tool replacement operation, but the tool can be carried into the correct operating position by acting on means with which the tool carrier itself is provided.

Although in this case the times necessary to change each tool for the successive one are significantly reduced, there is however, the disadvantage that the assembly constituted by the tool carrier and the various tools connected to it is rather bulky and does not allow the operating freedom which would be obtained if only a single tool were mounted on the tool carrier; in fact, the tools which are not utilised in any one cycle of measurement can interfere with parts of the surface of the workpiece, thereby significantly limiting the freedom of displacement of the head of the machine. The object of the present invention is that of providing a device for automatically effecting exchange of measuring tools in a measuring robot or machine of the type first indicated, by means of which the above described disadvantages can be eliminated and therefore by means of which it will be possible to effect, without intervention by an operator, exchange of tools on the head of the machine with such a high precision that it is no longer necessary to effect resetting of the tool upon each tool change.

SUMMARY OF THE INVENTION

The object of the present invention is achieved by means of a device for effecting automatic exchange of the measuring tool in a measuring machine, the said machine comprising a movable measuring arm operable to support the measuring tool, characterised by the fact that it comprises a series of tool carriers, each of which is provided with one of the said tools, a connection tang projecting from the tool carrier and the axis of which substantially coincides with that of the said tool, and a set of three bearings disposed substantially about the said axis in a plane orthogonal with the axis itself, a rack provided with a plurality of seats each of which is operable to support one of the said tool carriers, a support unit fixable to the said measurement head of the machine and provided with a series of frontal abutment surfaces operable to constitute bearings for the said bearings of the said set, connection means operable to grip the said connection tang of one of the said tool carriers following displacement of the said head of the machine, movable displacement means operable to support the said connection means and to displace the said tool carrier with respect to the said casing in the direction of the said axis of the tool from a first position in which the said three bearings of the said bearing set are at a predetermined distance from the said frontal surfaces of the said series, and a second position in which the bearings themselves are in contact with the frontal surfaces, the said displacement from the said first to the said second position being controlled by at least one first spring.

BRIEF DESCRIPTION OF THE DRAWINGS

For a better understanding of the present invention there will now be given, by way of example, a more detailed description of it with reference to the attached drawings, in which:

FIG. 1 is a perspective view of the device of the invention fitted to a movable arm of a measuring robot;

FIG. 4 is an axial section of a first part of the device;

FIG. 6 is a section, on an enlarged scale, of a part of the device of FIG. 3 taken on the line VI—VI.

DETAILED DESCRIPTION OF THE INVENTION

Figure 2:
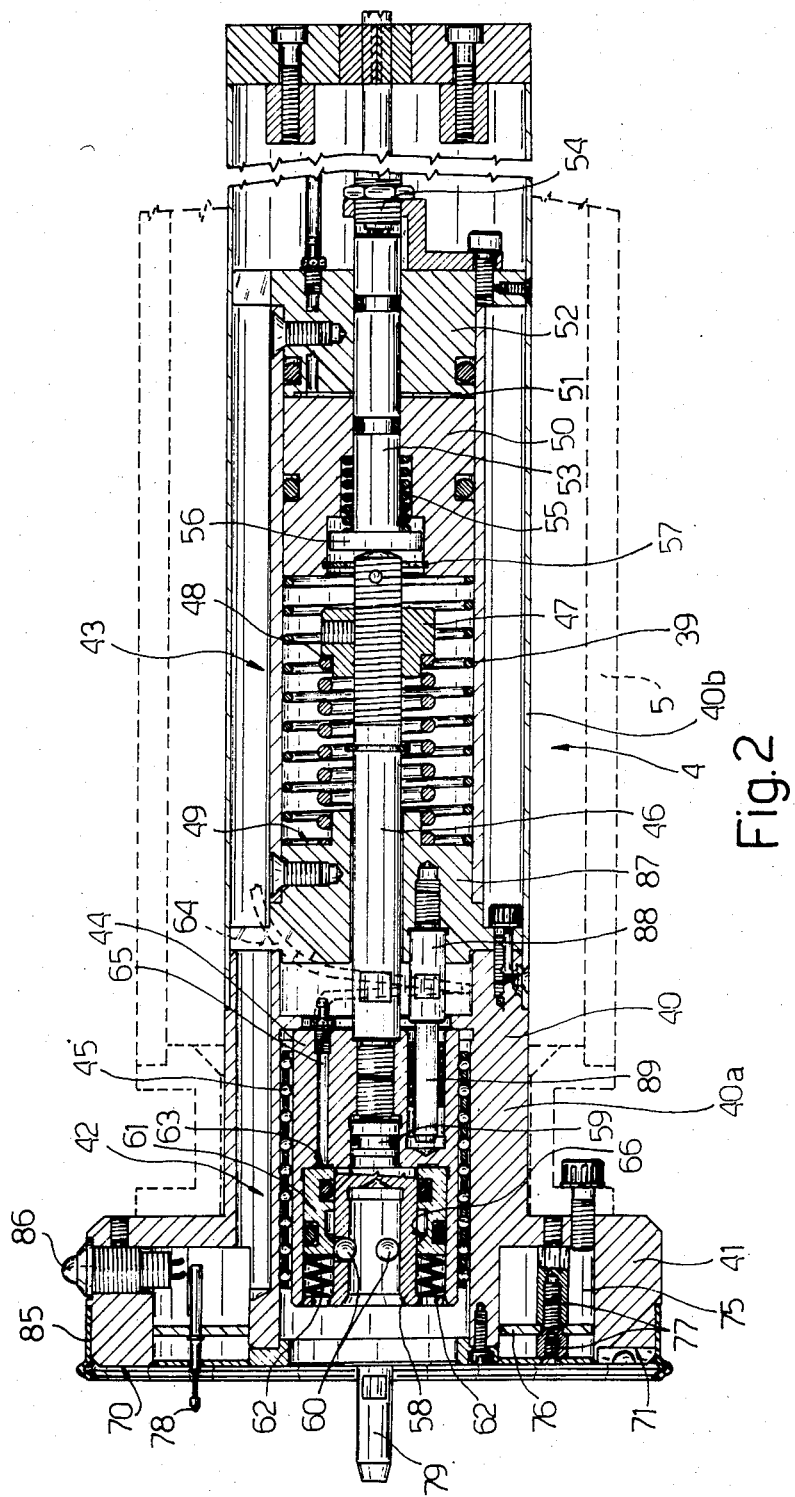
FIG. 2 is an axial section of a part of the device of the invention.

The device of the invention is adapted to be mounted on an arm 1 movable with respect to a base 2 of a measuring robot generaly indicated 3, or any other type of measuring machine. The device substantially comprises a support unit 4 fixed to the front part 5 (FIG. 2) of the arm 1 of the machine, a series of tool carriers 6, each of which is provided with a measuring tool 7 and a rack 8 provided with a plurality of seats 9 each of which is able to support a corresponding tool carrier 6.

Each tool carrier 6 shown in section in FIG. 4, comprises substantialy a disc 13 on a front surface 14 of which is fixed a boss 15 provided with a seat 16 for the end of the feeler tool 7; a cavity 17 is formed in this disc 13, in which there is locked a plate 18 from which projects a resiliently deformable flexible stem 19 at the end of which is fixed a connector tang 20. This latter has a head 21 delimited by a hemispherical surface, and is connected to the end of the stem 19 by means of a bush 22 provided with a shaft 23, screwed to the interior of the tang 20, and an axial hole in which the end of the stem 19 is fitted. As is clearly seen in FIG. 4 the stem 19 and part of the tang 20 are housed within the interior of an axial hole 24 of the disc 13, and a spring 12, interposed between the tang 20 and the disc 13, maintains the stem 19 in the rectilinear undeformed configuration. On the other front surface 25 of the disc 13 itself, opposite the surface 14, there are formed three seats 26 for corresponding rollers 27, the axes of which are disposed substantialy at 120° and lie parallel to radii of the disc 13 itself.

The disc 13 is provided with an annular groove 28 which can engage with corresponding plates 29 fixed to the arms 30 of the rack 8 (FIG. 1).

Within the disc 13 there is formed an annular cavity 33 in which there is lodged a part of a printed circuit 34 which is supported, with respect to the disc 13 itself, in any convenient manner, such as for example by means of a spacer assembly 35 connected to the disc 13 by means of threaded members; conveniently an annular cover 36 is provided to close the cavity 33.

The unit 4 conveniently includes a casing 40 (FIG. 2) of substantialy tubular form provided with a frontal flange 41; within this casing 40 there are disposed connection means, generally indicated 42, operable to grip, in a manner which will be described hereinbelow, the tang 20 of a tool carrier 6, and drive means, generally indicated 43, operable to support the first defined means and to displace the tool carrier 6 with respect to the casing 40 in the direction of the axis of the tool mounted on the tool carrier 6 itself.

The drive means 43 substantially comprise a first bush 44 movable axially with respect to the casing 40 with the interposition of a ball bush 45 for longitudinal movements, a shaft 46 rigidly connected to this bush 44 is provided with a collar 47 axially adjustable with respect to the shaft 46 itself by means of a threaded coupling, which is able to constitute a shoulder for a first spring 48 interposed between this shoulder an another shoulder 49 formed on the casing 40. The drive means 43 further include a piston 50 axially movable in a corresponding seat of the casing 40 by the action of an actuating fluid fed to a chamber 51; this piston 50 is normally held in its end-of-stroke position, towards the right in FIG. 2, against a block 52 by the action of a second helical spring 39 interposed between the piston 50 itself and the shoulder 49 of the casing 40.

Within the piston 50 there is formed an axial hole along which slides a rod 53 operable mechanically to connect the shaft 46 with a microswitch 54; a spring 55, interposed between a head 56 of the rod 53 and a shoulder of the piston 50, tends to thrust the rod 53 itself against a shoulder formed by means of a, stop ring 57.

The connection means 42 substantially comprise a bush 58 fixed, by means of a threaded rod 59, to the bush 44 of the drive means 43; this bush 58 is provided with a series of radial holes in each of which is housed a corresponding ball 60. A sleeve 61, interposed between the bush 58 and the bush 44, is movable axially and is normally sealed in its end-of-stroke position towards the right in FIG. 2, against the bush 44, by the action of the spring 62, whilst it can be thrust, in the opposite sense, by the action of an hydraulic fluid which is caused to act on the surface 63 of the sleeve 61 itself. This fluid can be supplied by means of a flexible duct 64 and an axial hole 65 formed in the bush 44. The sleeve 61 is provided with a conical surface 66 able to cooperate with the balls 60 in such a way as to thrust these inwardly of the bush 58 when the sleeve 61 itself is displaced axially towards the right in FIG. 2.

Figure 3:
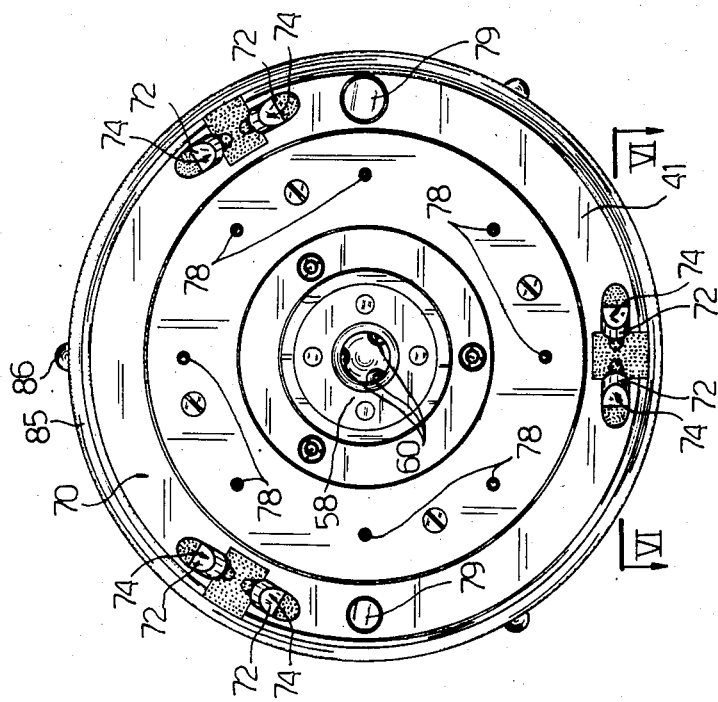
FIG. 3 is a front view of the part of the device shown in FIG. 2.
Figure 5:
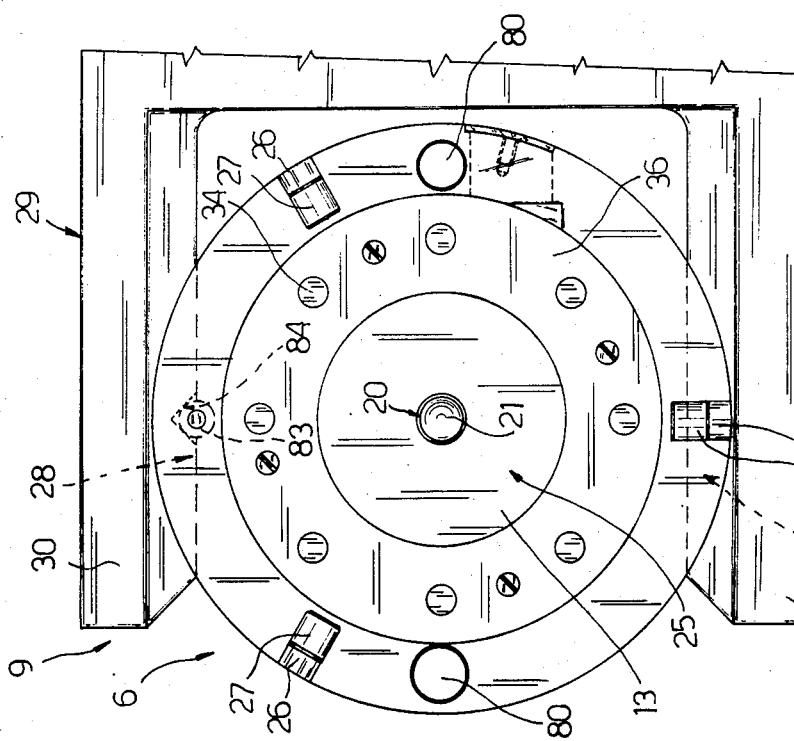
FIG. 5 is a front view of the part of the device shown in FIG. 4.

On the frontal surface 70 of the casing 40 there are formed housings 71 for pairs of rollers 72; the rollers 72 of each pair are disposed in such a way that their axes form an angle less than 180° (FIG. 6) to form a bearing with a substantially V-shape form for the corresponding rollers 27 of the tool carrier 6. Conveniently, each roller 72 is fixed in the housing 71 by means of adhesive (indicated with dots in FIGS. 6 and 3), and one end of the roller 72 is delimited by a flat surface 74 substantially coincident with the surface 70.

Within the casing 40 there is formed an annular cavity 75 which constitutes a housing for another part of the printed circuit 76, supported with respect to the housing 40 by means of a spacer assembly 77 connected by means of threaded members. From the printed circuit part 76 axially project tracer points 78, each of which is able to bear on a predetermined printed circuit zone of the circuit part 34 which is fixed to the tool carrier 6.

From the front surface 70 of the casing 40 project at least one pair of pins 79 of different diameter, each of which is able to couple with a corresponding hole 80 formed in the disc 13 of the tool carrier 6. Conveniently means are provided to retain each tool carrier 6 in a predetermined position between the arms 30 of the rack 8 comprising, for example, a peg 83 inserted in a corresponding hole of the disc 13 of the tool carrier itself and engageable with a corresponding seat 84 formed in one of the plates 29 of an arm 30 of the rack 8.

Conveniently, the diameters of the disc 13 of the tool carrier 6 and the flange part 41 of the casing 40 are equal to one another and on the second there is disposed a ring 85 of deformable material, in the form of a bellows, the edges of which can cooperate with the frontal surface 25 of the disc 13 of the tool carrier 6 to form a seal therewith.

A plurality of LED indicators 86 is disposed on the flange part 41 of the casing 40; these are electrically connected to the circuit of the device in a manner which will be indicated.

Conveniently the casing 40 comprises several parts connected together, such as a tubular element 40a to which the flange 41 is rigidly connected, and an annular element 40b connected to the preceding one by the interposition of a joining element 87; for the purpose of preventing rotation of the bush 44 during its axial movement there is provided a rod 88, screwed into the connecting element 87 and provided with a cylindrical section, 89 slidably coupled in a corresponding hole in the said bush 44.

The operation of the device described is as follows.

When there is no tool mounted on the device and it is in its rest configuration, its various parts are located in the relative positions illustrated in FIG. 1; on the rack 8 there is disposed a plurality of tool carriers 6 on each of which there is already mounted a corresponding tool 7. When a first tool 7 is to be mounted on the machine arm 1, displacement thereof is controlled to carry the unit 4 substantially into proximity with the selected tool 7 in such a way that the axis of the unit itself is substantially aligned with that of the associated tool carrier 6; the movement of the arm 1 is stopped when the frontal surface 70 of the unit 4 is located at a predetermined distance from the corresponding frontal surface 25 of the tool carrier 6 and when the pins 79 are partially introduced into the interior of the corresponding holes 80.

Subsequently, the connection means 42 are activated by sending actuating fluid through the duct 64 and the holes 65 to act on the active surface 63 of the sleeve 61 to control the displacement of it towards the left in the drawing, overcoming the resilient reaction of the springs 62; in this configuration the balls 60 are free to displace radially outwardly of the bush 58 itself.

Subsequently, the drive means 43 are activated by sending fluid under pressure to the interior of the chamber 51 to control displacement, towards the left of FIG. 1, of the piston 50; during the first part of this displacement the spring 55 is compressed until the head 56 of the rod 53 comes into contact with the corresponding shoulder of the piston 50 itself; contemporaneously, displacement towards the left in FIG. 2 of the bush 44 is controlled through the rod 53 until the tang 20 of the selected tool carrier 6 is inserted into the interior of the hole in the bush 58. Subsequently, the connection means 42 are activated by discharging the fluid under pressure which acts on the active surface 63 of the sleeve 61, allowing this to be displaced towards the right in FIG. 2 by the action of the springs 62; in this way radial inward displacement of the balls 60 is caused by the action of the conical surface 66 of the sleeve 61 itself. These balls 60 become disposed against the tang 20 on one side of the head 21 thereof, locking this tang 20 in place with respect to the bush 58.

The drive means 43 are again activated by now discharging fluid under pressure from the chamber 51 in such a way that displacement of the piston 50 towards the right in FIG. 2 by the action of the spring 39 is caused; during this displacement the bush 44 is displaced towards the right by the action of the spring 48 and therefore the tool carrier 6 is also displaced in the same sense until the surfaces of the rollers 27 of the tool carrier 6 itself are brought into contact with the corresponding surfaces of the rollers 72 of the unit 4. When this position is reached each of the rollers 27 bears on the corresponding pair of rollers 72 as is clearly seen in FIG. 6, and therefore the tool carrier 6 is position with respect to the unit 4 by means of a perfectly isostatic bearing assembly; in this way an extremely precise relative positioning is obtained, which does not require further operations of resetting of the tooling position. Moreover, the pressures exchanged between the surfaces of the rollers 27 and 72 have a predetermined value dependent on the preloading of the spring 48 selected in such a way as to prevent appreciable elastic deformations between the coupled surfaces; in this way local squeezing deformations are always the same whichever tool carrier 6 is fixed to the unit 4 so that an extremely precise positioning of the tool 7 mounted thereon is obtained.

In the said configuration the tracer points 78 of the unit 4 are in contact with the corresponding zones of the printed circuit part 34 of the tool carrier 6 to effect an electrical connection; in this way an electrical connection is established for the transmission of electrical signals generated by the tool 7 and for the transmission of other information such as that of the recognition code of the tool 7.

When the tool 7 of the tool carrier 6 which has been mounted on the unit 4 must be replaced, replacement of the associated tool carrier 6 with another is performed by effecting, in the opposite sense, the above described operations, to bring the tool carrier 6 back to the rack 8 and by effecting a further series of the same operations to withdraw a subsequent tool 7 carrier 6 therefrom. The operation of gripping each tool effected by the connection means 42 is facilitated because of the flexural deformability of the stem 19 (FIG. 4) which allows a certain transverse displacement of the head 21 of the tang 20 to insert it into the interior of the bush 58.

When each tool carrier 6 has been carried to the final assembly configuration by the action of the drive means 43, the right hand end in FIG. 2 of the shaft 46 is located at a predetermined distance from the head 56 of the rod 53; this latter is located in its left hand end-of-stroke configuration which is reached when the head 56 of the rod 53 itself comes into contact with the stop ring 57; in this configuration the right hand end of the rod 53 is no longer in contact with the microswitch 54 and therefore this is carried to the open position in such a way as to give a signal indicative of correct assembly of the tool carrier 6 on the unit 4.

Conveniently, by means of the LED indicators 86, a visual indication of the contact of each tracer probe with which the tool 7 is provided, with the surface of the workpiece under measurement can be given in the usual way.

It is therefore evident that with the automatic tool changing device of the invention the exchange of each tool can be effected in an entirely automatic manner without the intervention of the operator whilst obtaining an extremely high precision of positioning of the tool, which avoids the necessity of effecting resetting or calibrating operations of the tool; moreover, because of the significant compactness of the device, and in particular of the tool carrier 6 on which the tool 7 itself is mounted, the working zone which must be explored by the tool 7 is perfectly accessible.

It is apparent that the embodiment of the present invention described can be modified and varied both as to form and to arrangement of the various parts, without departing from the scope of the invention itself.

We claim:

1. For use in conjunction with a measuring machine including a movable measuring arm; and in conjuction with a plurality of measuring tools supportable one at a time by said arm, each tool possessing a tool axis; the combination comprising:

a plurality of tool carriers each receiving an individual one of said measuring tools thereon, each carrier including a tang defining a tang axis, said tang axis being substantially coincident with the tool axis of the individual tool received on each tool carrier, and each carrier including three bearings disposed about said tang in a plane perpendicular to said tang axis;

a rack having a plurality of seats, each seat adapted to support thereon an individual one of said measuring tools;

a plurality of bearing surfaces on said arm adapted for abutment by and alignment of said bearings on said tool carriers;

connecting means on said arm for releasably gripping the tang of any individual one of said tool carriers; and displacement means on said arm for moving said tool carrier in the direction of said tool axis from a first position whereat said bearings are spaced from said bearing surfaces, and to a second position whereat said bearings abut against and are aligned by said bearing surfaces, whereby said tool is positioned precisely with respect to said arm.

2. The combination according to claim 1, wherein said displacement means comprises:
   a first spring having first and second ends;
   a first axially movable bush, said connecting means being disposed in said first bush;
   a shaft rigidly connected to said first bush, said shaft having a collar thereon abutted by said first end of said first spring;
   a first shoulder on said arm abutted by said second end of said spring;
   a hydraulically actuated piston means connected to said shaft for moving said shaft from a second shaft position whereat said bearing and said tool carrier are adjacent to and aligned by said bearing surfaces, and to a first shaft position whereat said bearings are spaced from said bearing surfaces;
   a second shoulder on said arm; and
   a second spring disposed between said piston and said second shoulder for displacing said shaft from said first shaft position to said second shaft position.

3. The combination according to claim 2, further comprising:
   a bore in said piston;
   a rod movably disposed in said bore, coaxial with said shaft;
   a third spring loading said rod; and
   a switch adapted to generate a signal indicative that no tool carrier tang is gripped by said connecting means;
   wherein said rod mechanically connects said shaft to said switch such that said switch is actuated by said shaft when said first bush is displaced by said first spring towards said piston.

4. The combination according to claim 2, wherein said tang comprises a substantially cylindrical leg and a head on said leg; and wherein said connecting means comprises: a second bush rigidly connected to said first bush, said second bush including a plurality of radial hole; a matching plurality of balls movable in said holes; and an axially movable sleeve disposed between said first and second bushes; such that said balls are movable to a position whereat said balls lock said head with respect to said second bush.

5. The combination according to claim 4, wherein said sleeve includes a conical surface abuttable against said balls so that movement of said sleeve in a first direction displaces said balls radially towards said head of said tang; and said combination further comprises a sleeve spring biasing said sleeve in said first direction and hydraulic means for moving said said sleeve in a second direction opposite to said first direction.

6. The combination according to claim 2, further comprising a longitudinally displaceable ball bush supporting said first bush on said arm.

7. The combination according to claim 1, wherein said tool carrier comprises:
   a disk having an axial bore, a first face from which said tang projects, and a second face opposite said first face; and a bush fixed to said second face, said second bush including a seat for mounting said tool thereon; wherein said three bearings are disposed on said first face of said disk.

8. The combination according to claim 7, wherein said tool carrier further comprises: a flexurally resiliently deformable stem embedded in said disk having a free stem end, said tang being affixed to said free stem end; and a spring disposed between sadi tang and said disk, exerting an axial force o said tang so as to bias said stem towards an undeformed configuration when no force acts on said tang.

9. The combination according to claim 7, wherein said stem is at least partly housed in said axial bore of said disk, and said disk comprises a housing and a small plate locked to said housing, said stem being affixed to said plate.

10. The combination according to claim 1, wherein each of said carriers includes a peripheral groove and said rack includes a plurallity of forks formed by pairs of arms insertable into said peripheral grooves of said carriers; and wherein said combination further comprises a centering member interposed between one of said arms and each of said carriers so as to hold each carrier in a predetermined orientation with respect to said forks.

11. The combination according to claim 1, wherein said three bearings comprise three roller seats in said carrier and the three rollers partially housed on e each in each of said seats, each of said rollers having an axis of rotation disposed radially with respect to said axis of said tang; and wherein said bearing surfaces on said arm are formed from three pairs of secod rollers affixed to said arm, the rollers of each pair of second rollers having axes disposed at an angle less than 180° so as to form a V-shaped abutment for one of said first rollers.

12. The combination according to claim 1, further comprising a portion of substantially tubular form on said arm, and a frontal flange on said portion having a diameter substantially equal to that of said tool carrier; wherein said flange includes an annular flange groove, a first printed circuit part housed in said flange groove, and a plurality of electrical connection tracer points projecting from said printed circuit part; and wherein said tool carrier includes an annular carrier groove, a second printed circuit part housed in said carrier groove, and a plurality of abutment zones on said second printed circuit part, against which said points on said first printed circuit part bear, when said tool carrier is connected to said arm by said connecting means.

13. The combination according to claim 1, further comprising at least one pair of pins on said arm having different diameters, wherein each of said tool carriers includes a pair of holes dimensioned to receive said pins therein.

* * * * *

UNITED STATES PATENT AND TRADEMARK OFFICE
CERTIFICATE OF CORRECTION

PATENT NO. : 4,706,372
DATED : November 17, 1987
INVENTOR(S) : Franco Ferraro et al It is certified that error appears in the above-identified patent and that said Letters Patent is hereby corrected as shown below:

In the Abstract:
   Line 3, delete "aseries" and insert --a series--.

Col. 2, line 53, delete "IHE" and insert --THE--;

Col. 7, line 44, delete "hole" and insert --holes--;

Col. 8, line 13, delete "sadi" and insert --said--;
Col. 8, line 14, delete "u" and insert --on--;
Col. 8, line 33, delete "on e" and insert --one--;
Col. 8, line 37, delete "secod" and insert --second--

Signed and Sealed this

Thirty-first Day of May, 1988

*Attest:*

DONALD J. QUIGG

*Attesting Officer*  *Commissioner of Patents and Trademarks*